US006005512A

United States Patent [19]

Wong

[11] Patent Number: 6,005,512

[45] Date of Patent: Dec. 21, 1999

[54] ARRAY ANTENNAS WITH LOW SUM AND DIFFERENCE PATTERN SIDE LOBES AND METHOD OF PRODUCING SAME

[75] Inventor: Sam H. Wong, Yorba Linda, Calif.

[73] Assignee: Boeing North American, Inc., Seal Beach, Calif.

[21] Appl. No.: 09/098,409

[22] Filed: Jun. 16, 1998

[51] Int. Cl.[6] .......... G01S 13/44

[52] U.S. Cl. .......... 342/80

[58] Field of Search .......... 342/80, 383, 384

[56] References Cited

U.S. PATENT DOCUMENTS

| | | | |
|---|---|---|---|
| 3,860,934 | 1/1975 | Cheo et al. | 343/778 |
| 3,965,475 | 6/1976 | Deerkoski et al. | 342/374 |
| 4,754,286 | 6/1988 | Brunner et al. | 343/771 |
| 4,792,805 | 12/1988 | Miglia | 342/154 |
| 4,882,587 | 11/1989 | Vodopia | 342/152 |
| 5,068,671 | 11/1991 | Wickes et al. | 343/799 |
| 5,148,182 | 9/1992 | Gautier et al. | 343/754 |

*Primary Examiner*—Daniel T. Pihulic
*Attorney, Agent, or Firm*—Stout, Uxa, Buyan & Mullins, LLP; Donald E. Stout

[57] ABSTRACT

A radar system and method for obtaining low sum and difference side lobe patterns from a phased array antenna comprising radiators distributed amongst four quadrants A, B, C, and D. The quadrants are arranged in a clockwise order of A, B, D, and C. Each quadrant is further divided into an inner portion and an outer portion. The monopulse sum pattern is determined by adding signals received by radiators in the A quadrant, B quadrant, C quadrant, and D quadrant. The elevation difference pattern is determined by subtracting a CD sum consisting of signals received by radiators in the C outer portion and the D outer portion from an AB sum consisting of signals received by radiators in the A outer portion and the B outer portion. The azimuth difference pattern is determined by subtracting a BD sum consisting of signals received by radiators in the B outer portion and the D outer portion from an AC sum consisting of signals received by radiators in the A outer portion and the C outer portion.

16 Claims, 7 Drawing Sheets

Fig. 6
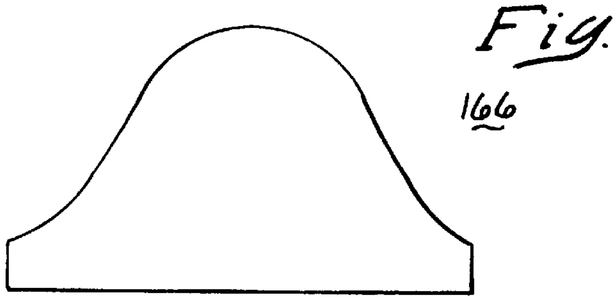
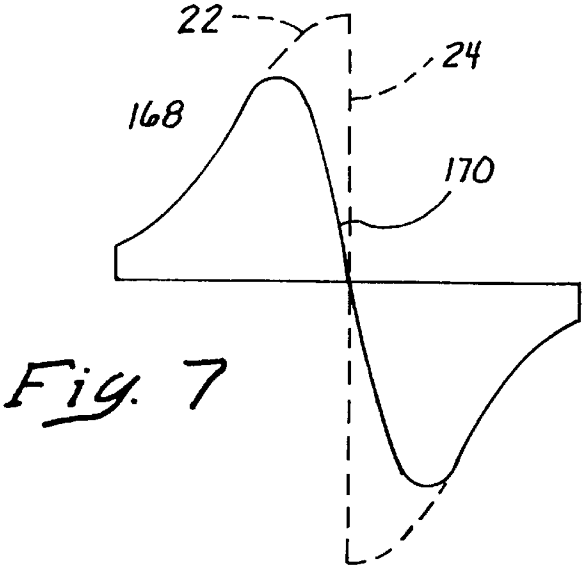
Fig. 7
Fig. 8
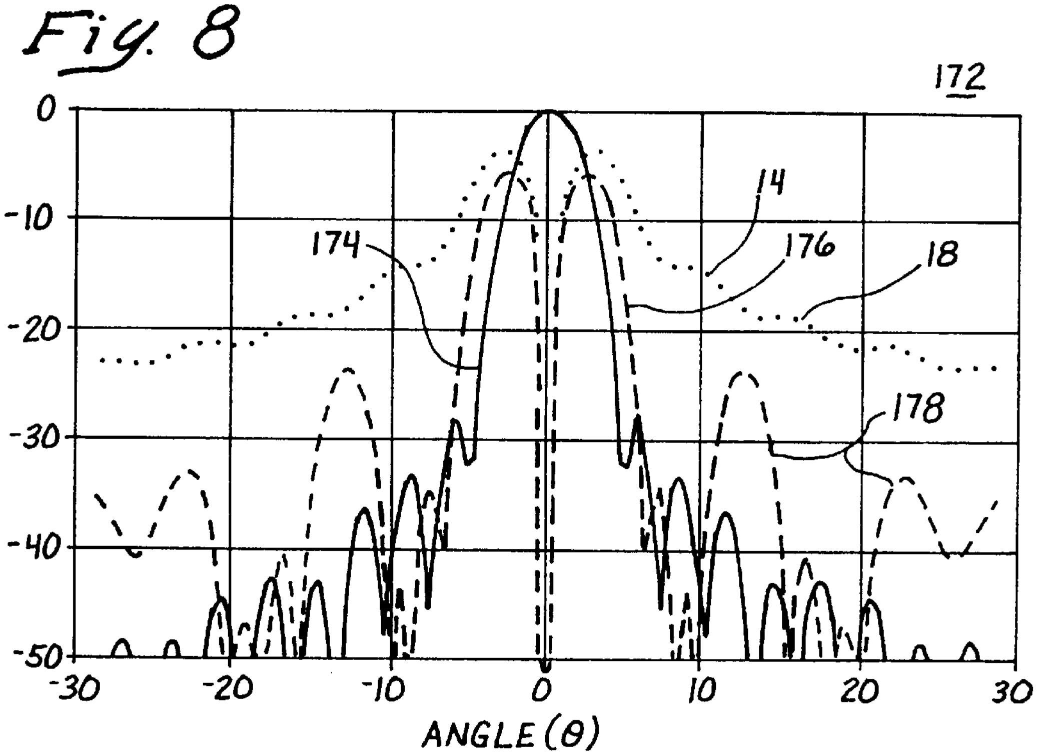

ARRAY ANTENNAS WITH LOW SUM AND DIFFERENCE PATTERN SIDE LOBES AND METHOD OF PRODUCING SAME

BACKGROUND OF THE INVENTION

1. Field of the Invention

This invention relates to array antennas and, more specifically, to the side lobe patterns generated by those antennas.

2. Description of the Related Art

Conventional monopulse corporate-fed array antennas produce very high difference pattern side lobes in their principal planes. Referring now to FIG. 1, graph 10 shows an example of a sum pattern 12 and difference pattern 14 of a conventional corporate-fed standing wave array antenna. The sum pattern 12 has low sum pattern side lobes 16. The difference pattern 14 has relatively high side lobes 18. Referring now to FIGS. 2 and 3, the array aperture sum amplitude distribution 20 and difference amplitude distribution 22 are usually optimized for low sum pattern side lobes 16. The optimization creates an abrupt change at the center 24 of the difference amplitude distribution 22. It is this abrupt change, or discontinuity of the amplitude distribution, that produces the very high difference pattern side lobes 18.

There are existing approaches for achieving both low sum and difference side lobes from corporate-fed arrays. The Antenna Engineering Handbook, Third Edition, by Richard Johnson, FIG. 20–44 ("Johnson") discloses a typical existing approach comprising a phase monopulse corporate-fed phased array that produces low sum and difference side lobes. Johnson discloses the pairing of radiating elements that are symmetrically opposite from the centerline of the array. The paired radiating elements are combined in a magic T to form the sum and difference patterns. This approach is relatively complex and not applicable to corporate-fed wave guide standing wave array antenna design.

Therefore, a radar system comprising an array antenna of relatively simple construction that provides low difference side lobes is needed.

SUMMARY OF THE INVENTION

To fulfill the above and other objectives of the invention, a radar system and method for obtaining low sum and difference side lobe patterns from phased array antennas is provided. The radar system has a corporate-fed wave guide standing wave array antenna comprising radiators distributed amongst four quadrants A, B, C, and D. The quadrants are arranged in a clockwise order of A, B, D, and C. Each quadrant is further divided into an inner portion and an outer portion. The monopulse sum pattern is determined by adding signals from radiators in both the inner and outer portions of the A quadrant, B quadrant, C quadrant, and D quadrant. The elevation difference pattern is determined by subtracting signals received by radiators in the C outer portion and the D outer portion from signals received by radiators in the A outer portion and the B outer portion. The azimuth difference pattern is determined by subtracting signals received by radiators in the B outer portion and the D outer portion from signals received by radiators in the A outer portion and the C outer portion.

In an aspect of the invention, the aperture array antenna is a passive phased array antenna. The passive phased array antenna has an outer quad array corporate feed that is functionally connected to the radiators in the aperture array antenna outer portions and an inner quad array corporate feed that is functionally connected to the radiators in the aperture array antenna inner portions.

In an aspect of the invention, the aperture array antenna is an active aperture phased array antenna. The radar system has an active aperture phased array antenna that has an outer quad array receive corporate feed that is functionally connected to the radiators in the aperture array antenna outer portions and an inner quad array receive corporate feed that is functionally connected to the radiators in the aperture array antenna inner portions.

In another aspect of the invention, the aperture array antenna is an active aperture phased array antenna. The radiators are independently controlled by corporate feed networks that transmit a sum signal and receive both sum and difference signals. The sum signal is received by an independently controllable sum aperture distribution corporate feed network. The difference signals are received by another independently controllable difference aperture distribution corporate feed network.

In another aspect of the invention, the shapes of the inner and outer portions of the aperture array antenna are designed to achieve predetermined difference patterns.

In another aspect of the invention the shapes of the inner and outer portions of the aperture array antenna are designed to optimize the sum, elevation difference, and azimuth difference patterns.

Other and further objects and advantages will appear hereinafter.

BRIEF DESCRIPTION OF THE DRAWINGS

FIG. 6 shows a graph of an array aperture sum amplitude distribution according to an embodiment of the invention;

FIG. 7 shows a graph of an array aperture difference amplitude distribution according to an embodiment of the invention;

FIG. 8 shows a graph of a sum pattern and difference pattern of a corporate-fed wave guide standing wave array antenna according to an embodiment of the invention;

DESCRIPTIONS OF THE PREFERRED EMBODIMENTS

Figure 4A:
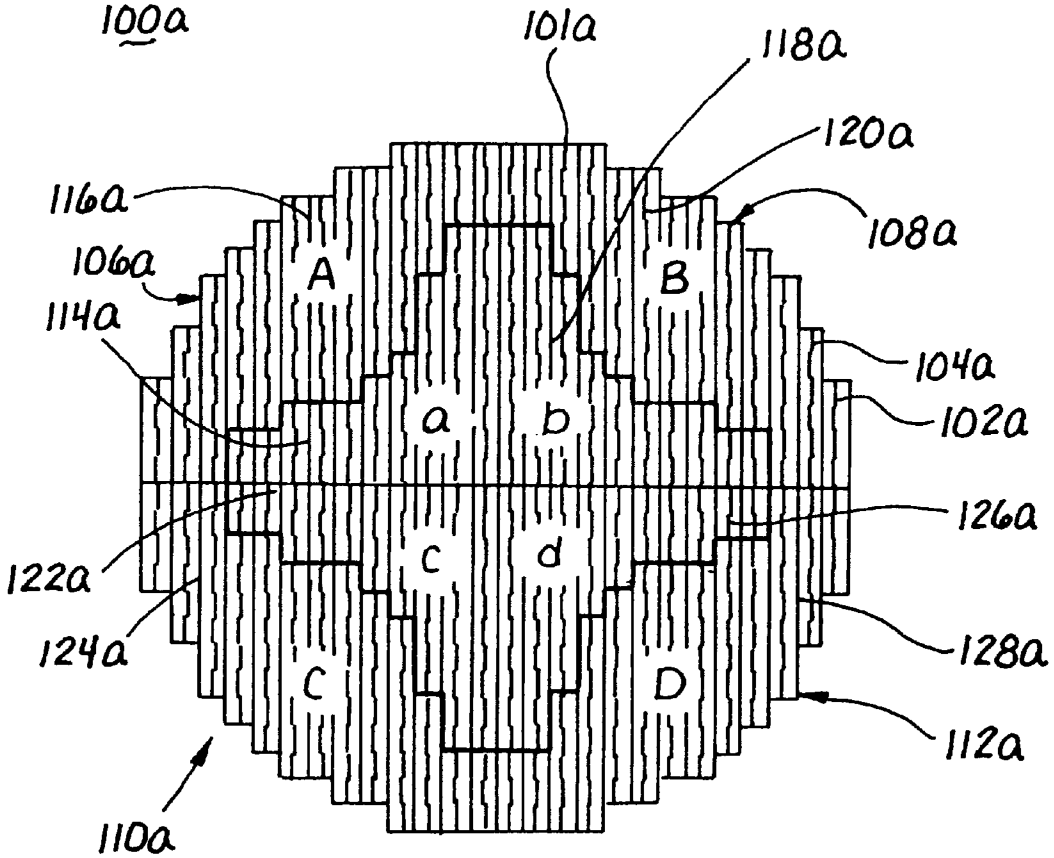
FIGS. 4A and 4B show schematic layouts of radiators on an array aperture according to embodiments of the invention.

Referring now to FIG. 4A, an array aperture 100*a* according to an embodiment of the invention, has a surface 102*a* covered with radiators 104*a*. The surface 102*a* is divided into an A quadrant 106*a,* a B quadrant 108*a,* a C quadrant 110*a,* and a D quadrant 112*a*. The term "quadrant" is defined as approximately one quarter of the surface and may, or may not, have borders that align with the radii of the aperture. The clockwise order of the quadrants is the A quadrant 106*a,* the B quadrant 108*a,* the D quadrant 112*a,* and the C quadrant 110*a*. The A quadrant 106*a* has an a inner portion 114*a* and an A outer portion 116*a*. The B quadrant 108*a* has a b inner portion 118*a* and a B outer portion 120*a*. The C quadrant 110*a* has a c inner portion 122*a* and a C outer portion 124*a*. The D quadrant 112*a* has a d inner portion 126*a* and a D outer portion 128*a*. The designation "inner portion" does not imply that the inner portions for other embodiments of the invention are wholly surrounded by the outer portions, as is the case in the instant embodiment. Further, other embodiments of the invention may have discontinuous portions.

Figure 4B:
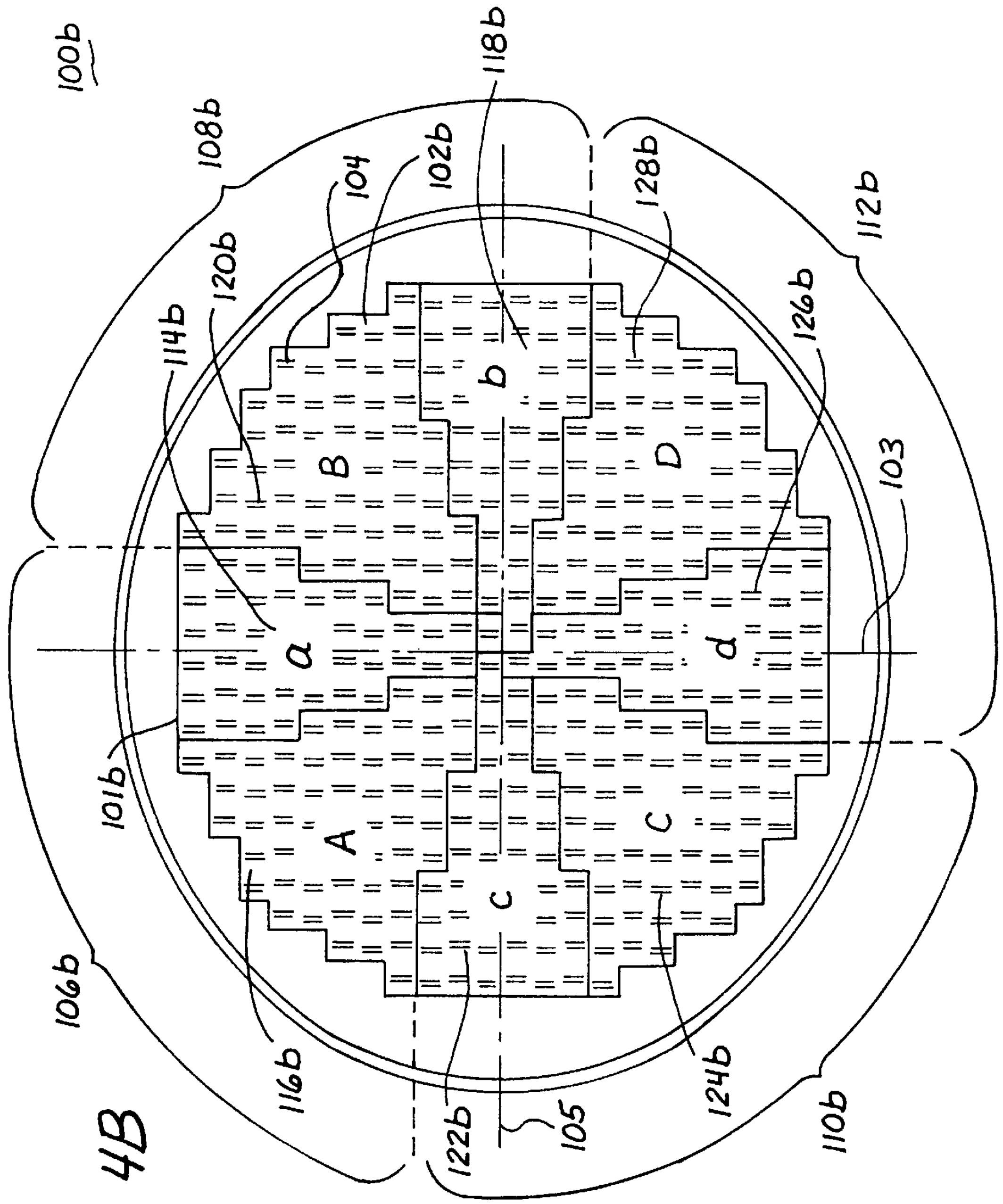

Referring now to FIG. 4B, wherein structures as comparable to structures of FIG. 4A with the same numerical prefix according to another embodiment of the invention, an array aperture 100*b* comprises inner portions 114*b,* 118*b,* 122*b,* and 126*b* that extend to the perimeter 101*b* of the aperture. The surface 102*b* is divided into an A quadrant 106*b,* a B quadrant 108*b,* a C quadrant 110*b,* and a D quadrant 112*b*. The clockwise order of the quadrants is the A quadrant 106*b,* the B quadrant 108*b,* the D quadrant 112*b,* and the C quadrant 110*b*.

The A, B, C, D outer portions 116*b,* 120*b,* 124*b,* and 128*b* of the array aperture 100*b* are adjacent the a, b, c, d inner portions 114*b,* 118*b,* 122*b,* and 126*b*. More specifically, the a inner portion 114*b* straddles a centerline 103 between the A quadrant 106*b* and the B quadrant 108*b*. Further, the b inner portion 118*b* straddles a centerline 105 between the B quadrant 106*b* and the D quadrant 112*b*. Additionally, the d inner portion 126*b* straddles the centerline 103 between the D quadrant 112*b* and the C quadrant 110*b*. Further, the c inner portion 122*b* straddles the centerline 105 between the C quadrant 110*b* and the A quadrant 106*b*. As the embodiment of FIG. 4*b* illustrates, the term "quadrant" should be loosely interpreted to mean that a quadrant is comprised of an outer portion and an inner portion that is approximately one quarter of the array.

Figure 5:
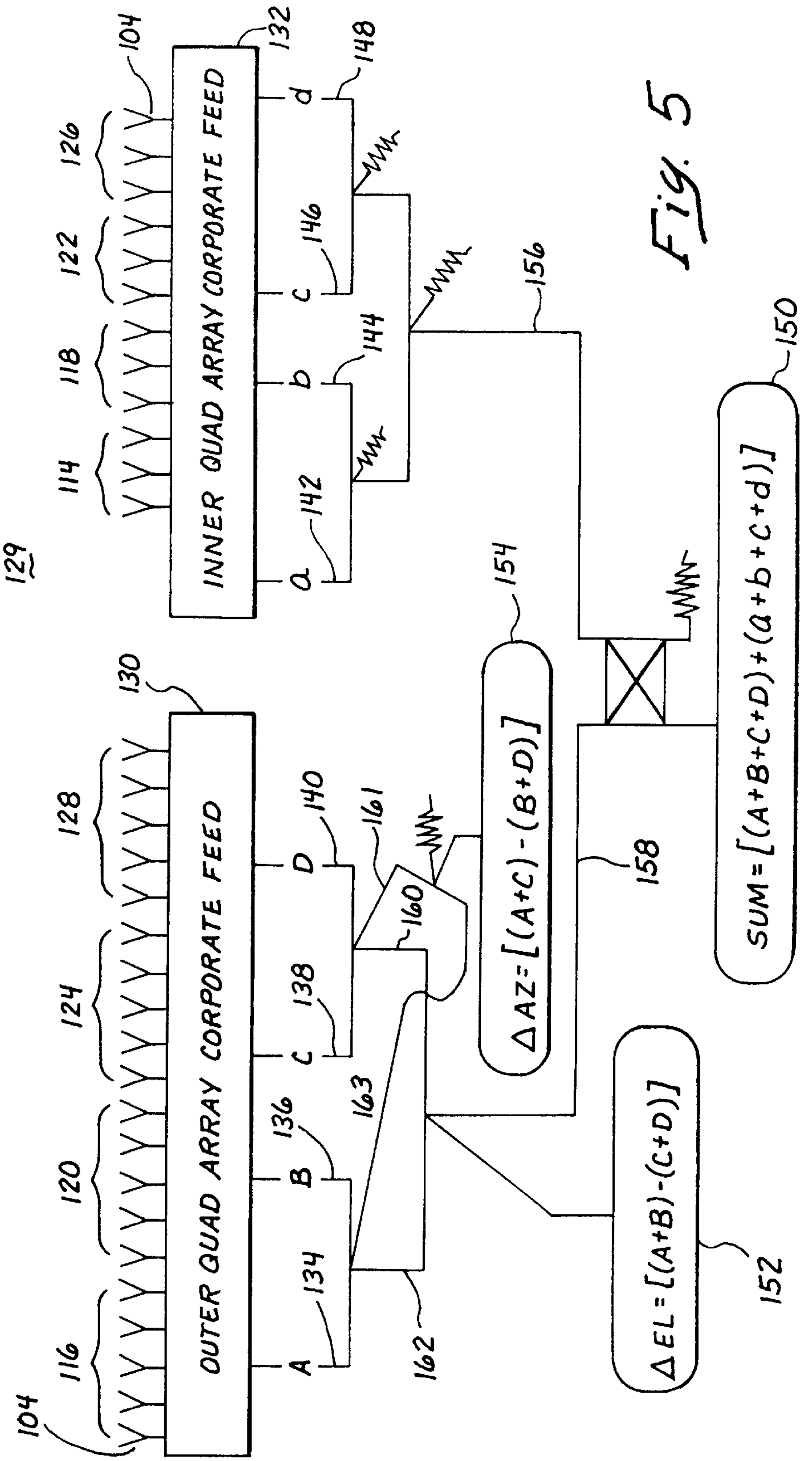
FIG. 5 shows a schematic diagram of a radar system's passive aperture phased array antenna monopulse feed network according to an embodiment of the invention.

Referring now to FIG. 5, in a radar system's passive aperture phased array antenna 129, the radiators 104 are functionally connected to an outer quad array corporate feed 130 and an inner quad array corporate feed 132. More specifically, the radiators 104 in the A, B, C, D outer portions 116, 120, 124, and 128 are functionally connected to the feed 130 and the radiators 104 in the a, b, c, d inner portions 114, 118, 122, and 126 are functionally connected to the feed 132. The feed 130 identifies and outputs the signals 134, 136, 138, and 140 coming from A, B, C, D outer portions 116, 120, 124, and 128, respectively. The feed 132 identifies and outputs the signals 142, 144, 146, and 148 coming from a, b, c, d inner portions 114, 118, 122, and 126, respectively.

The outputs from the feeds 130 and 132 are combined to form a sum signal 150, an elevation difference signal 152, and an azimuth difference signal 154. To form the sum signal 150, the signals 142, 144, 146, and 148 are combined into an [a+b+c+d] signal 156 and the signals 134, 136, 138, and 140 are combined into [A+B+C+D] signal 158. The [A+B+C+D] signal 158 is then combined with the [a+b+c+d] signal 156 to form the sum signal 150. To form the elevation difference signal 152, the signals 138 and 140 are combined into a (C+D) signal 160 and the signals 134 and 136 are combined into an (A+B) signal 162. The (C+D) signal 160 is subtracted from the (A+B) signal 162 to form the elevation difference signal 152. To form the azimuth difference signal 154, the signal 136 is subtracted from the signal 134 to form an (A–B) signal 163, and the signal 140 is subtracted from the signal 138 to form a (C–D) signal 161. The (A–B) signal 163 and the (C–D) signal 161 are then combined to form the elevation difference signal [(A+C)–(B+D)] 154.

Figure 1:
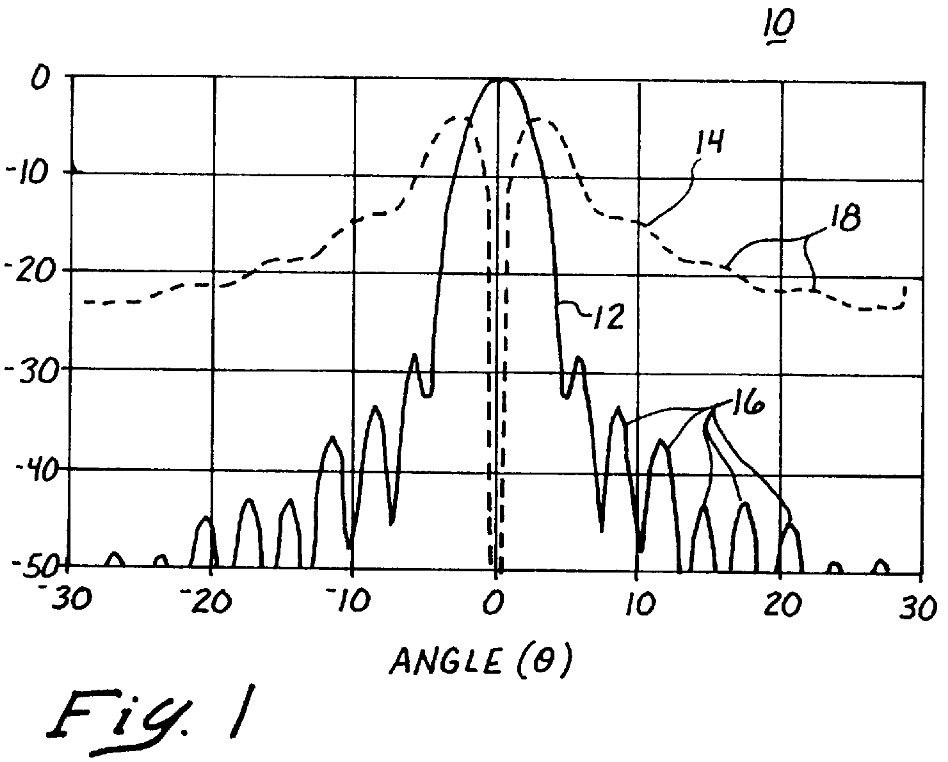
Fig. 1 PRIOR ART
FIG. 1 shows a graph of a sum pattern and difference pattern of a corporate-fed wave guide standing wave array antenna disclosed in the prior art.
Figure 2:
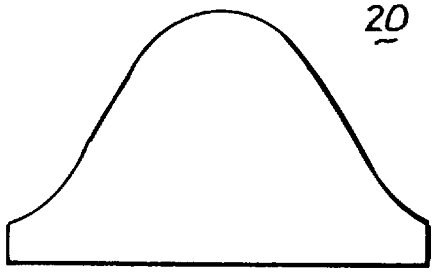
Fig. 2 PRIOR ART
FIG. 2 shows a graph of an array aperture sum amplitude distribution of a corporate-fed wave guide standing wave array antenna disclosed in the prior art.
Figure 3:
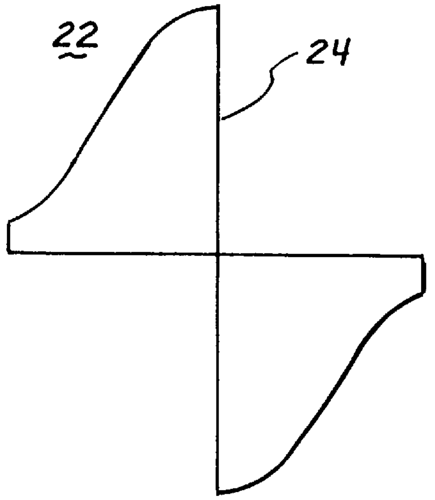
Fig. 3 PRIOR ART
FIG. 3 shows a graph of an array aperture difference amplitude distribution of a corporate-fed standing wave array antenna disclosed in the prior art.

Referring now to FIG. 6, as a result of using signals from all of the radiators 104, an array aperture sum amplitude distribution 166 of the sum signal 150 is the same as the array aperture sum distribution 20 of the prior art (see FIG. 2).

Referring now to FIG. 7, by not using the signals 142, 144, 144, and 146 from the a, b, c, d inner portions 114, 118, 122, and 126, the abrupt change of the difference amplitude distribution at the center 24 of the array aperture 22 is removed. The removal of the abrupt change results in having a difference amplitude distribution 168 with a less abrupt amplitude change at the array aperature center 170.

Referring now to FIG. 8, graph 172 shows a sum pattern 174, the prior art difference pattern 14, and a difference pattern 176. As there is no change in the combining of the signals 134 through 148 from the array aperture 100 of the current invention compared to the prior art, the sum pattern 174 is the same as the sum pattern 12 of the prior art. However, the result of not using the a, b, c, d signals 142 through 148 from the a, b, c, d inner portions 114, 118, 122, and 126 results in a difference pattern 176 that has much lower difference side lobes 178 compared to the relatively high difference side lobes 18 of the difference pattern 14 of the prior art.

The size and shape of the difference side lobes may be predetermined by a designer of apertures choosing appropriate shapes of the A, B, C, D outer portions 116, 120, 124, and 128 and the a, b, c, d inner portions 114, 118, 122, and 126 using techniques commonly known in the art. Likewise, the size and shapes of the difference side lobes may also be optimized using techniques commonly known in the art.

Figure 9:
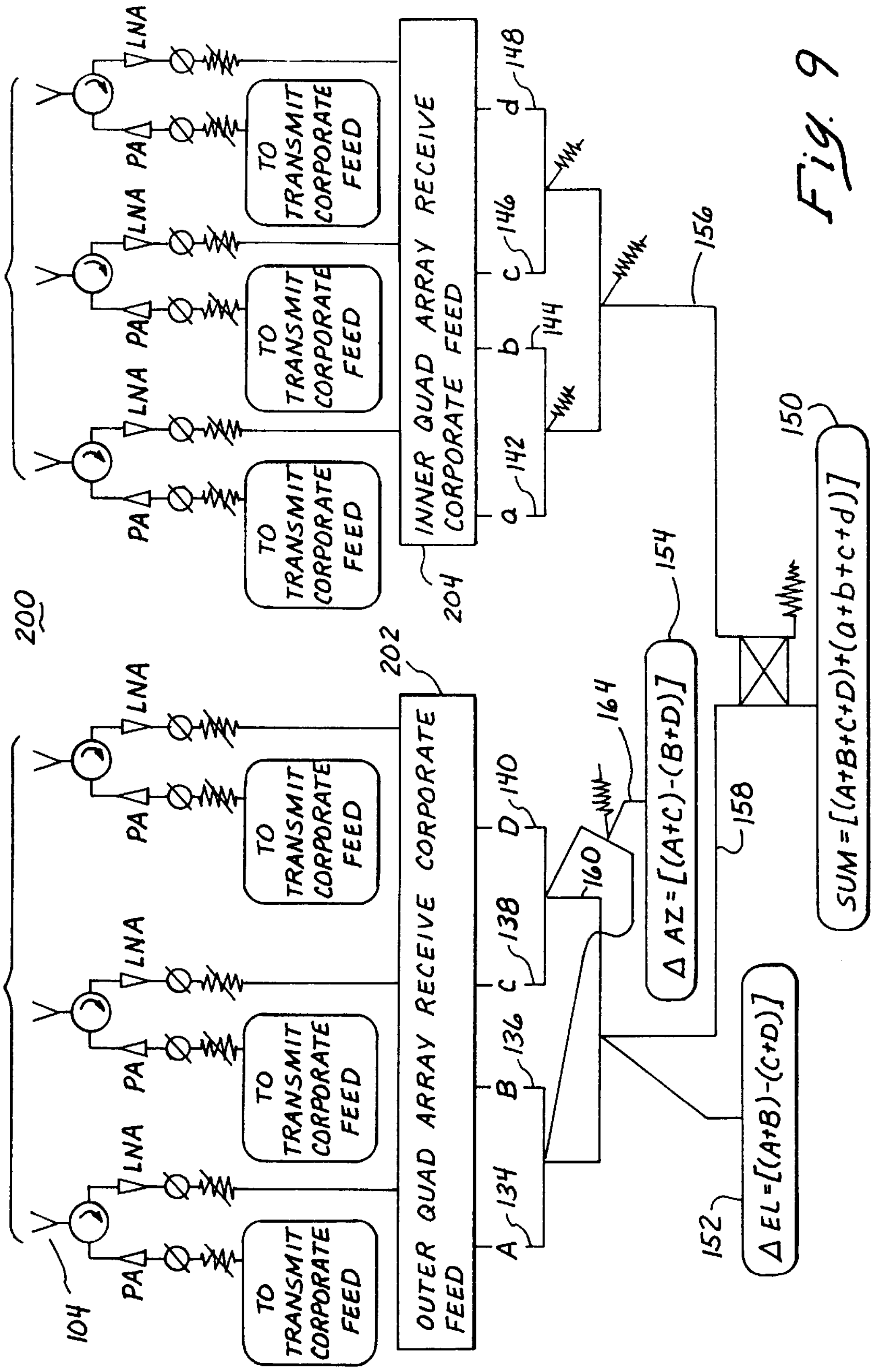
FIG. 9 shows a schematic diagram of a monopulse feed network for an active aperture phased array antenna according to an embodiment of the invention.

Referring now to FIG. 9, a radar system's active aperture phased array antenna 200 is similar to the passive aperture array antenna 129 (see FIG. 5) except for the feeds. The transmit sum feed and the receive sum and difference feeds are independently optimized for the best system performance, but the receive difference feed networks are not independent of the receive sum network. The antenna 200 has an outer quad array receive feed 202 functionally connected to the radiators 104 of A, B, C, D portions 116, 120, 124, and 128. The embodiment shown in FIG. 9 also has an inner quad array receive feed 204 functionally connected to the radiators 104 of a, b, c, d portions 114, 118, 122, and 126.

Figure 10:
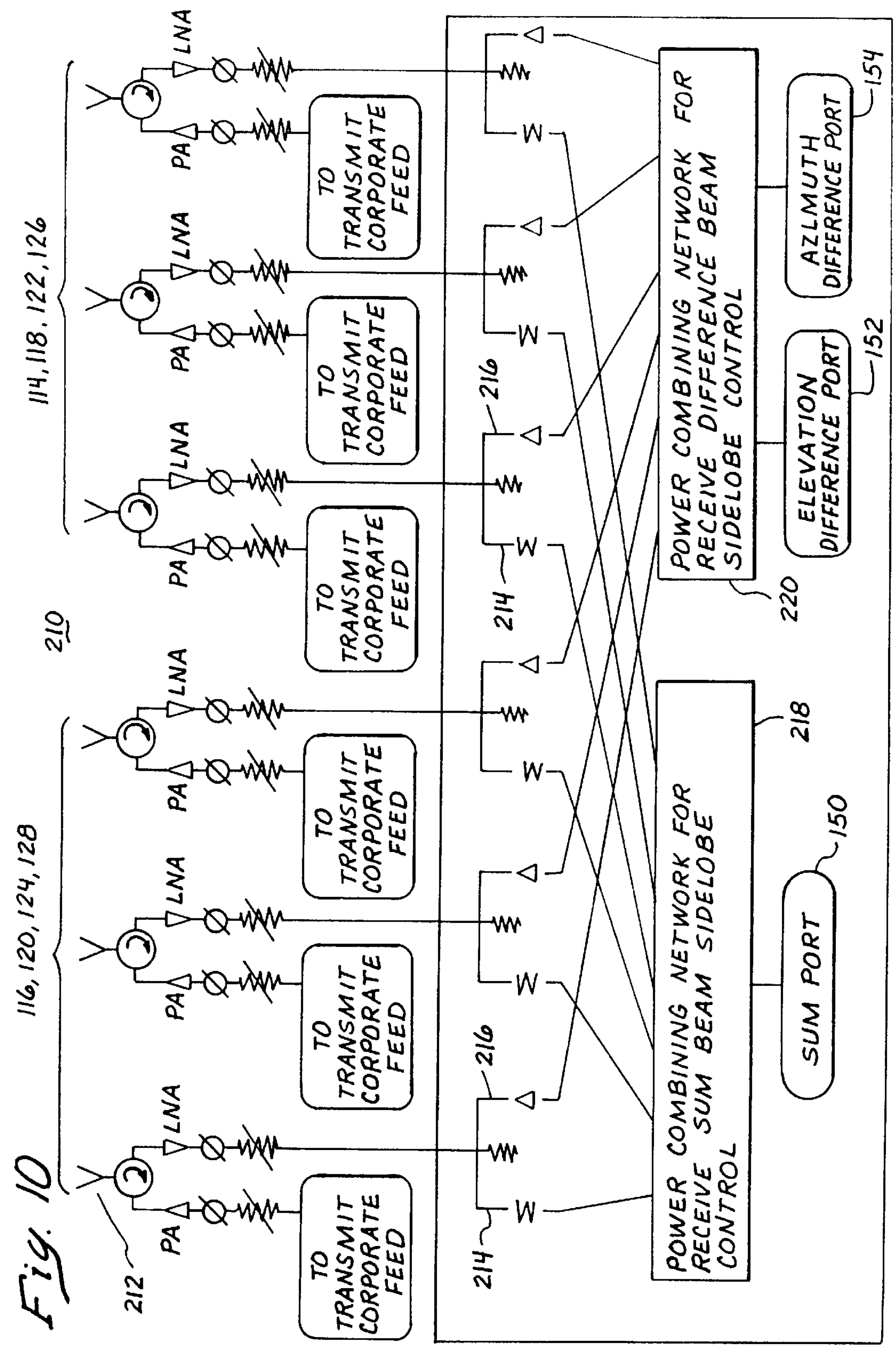
FIG. 10 shows a schematic diagram of a monopulse feed network for active aperture phased array antenna with independently controllable aperture feed networks for sum and difference aperture distributions according to an embodiment of the invention.

Referring now to FIG. 10, a radar system's active aperture phased array antenna 210 is similar to the active aperture phased array antenna 200 but for the radiators 212 and the feeds 218 and 220. The radiators 212 are independently controlled and each radiator receives a sum signal 214 and a difference signal 216. The sum signals 214 are received by an independently controllable sum aperture feed network 218. The difference signals 216 are received by an independently controllable difference aperture feed network 220. Due to the flexibility of the feeds 218 and 220, the array aperture does not need to separate into inner portions 114, 118, 122, 126, and the outer portions 116, 120, 124, 128, to achieve predetermined array aperture amplitude distributions to obtain low sum and difference side lobe patterns because the receive difference aperture distributions are independent of the sum aperture distribution.

The present invention may be embodied in other specific forms without departing from its spirit or essential attributes. For example, embodiments of the invention may use any means or combination of means for removing the received signals from the inner quadrants for the purpose of reducing the difference patterns side lobes. Accordingly, reference should be made to the appended claims, rather than to the foregoing specification, as indicating the scope of the invention.

I claim:

1. A corporate-fed phased array antenna system for obtaining low sum and difference side lobe patterns comprising:

a. an aperture array antenna comprising a surface covered with radiators, the surface being divided into an A quadrant, a B quadrant, a C quadrant, and a D quadrant, wherein the clockwise order of the quadrants is A, B, D, and C, and each quadrant comprises an inner portion and an outer portion;

b. sum means for determining a monopulse sum pattern by adding signals received by radiators in the A quadrant, B quadrant, C quadrant, and D quadrant;

c. elevation difference means for determining a monopulse elevation difference pattern by subtracting a CD sum consisting of signals received by radiators in the C outer portion and the D outer portion from an AB sum consisting of signals received by radiators in the A outer portion and the B outer portion; and d. azimuth difference means for determining a monopulse azimuth difference pattern by subtracting a BD sum consisting of signals received by radiators in the B outer portion and the D outer portion from an AC sum consisting of signals received by radiators in the A outer portion and the C outer portion.

2. The system of claim 1 further comprising:

a. an outer quad array corporate feed functionally connected to the radiators in the aperture array antenna outer portions and functionally connected to the sum means, elevation difference means and azimuth difference means; and b. an inner quad array corporate feed functionally connected to the radiators in the aperture array antenna inner portions and functionally connected to the sum means, wherein the aperture array antenna is passive.

3. The system of claim 1 further comprising:

a. an outer quad array receive corporate feed is functionally connected to the radiators in the active aperture array antenna outer portions and functionally connected to the sum means, elevation difference means and azimuth difference means; and b. an inner quad array receive corporate feed is functionally connected to the radiators in the aperture array antenna inner portions and functionally connected to the sum means, wherein the aperture array antenna is an active aperture phased array antenna.

4. The system of claim 1 wherein:

a. radiators are independently controlled and transmit a sum signal and receive a sum signal and two difference signals;

b. the sum means comprises an independently controllable sum aperture distribution feed network that receives signals from the radiators;

c. the elevation difference means and azimuth difference means comprise an independently controllable difference aperture distribution feed network that receives signals from the radiators; and d. the aperture array antenna is an active aperture phased array antenna.

5. A process for obtaining low sum and difference side lobe patterns from a corporate-fed phased array antenna system comprising the steps of:

a. providing an aperture array antenna comprising a surface covered with radiators, the surface being divided into an A quadrant, a B quadrant, a C quadrant, and a D quadrant, wherein the clockwise order of the quadrants is A, B, D, and C, and each quadrant comprises an inner portion and an outer portion;

b. determining a monopulse sum pattern by adding signals received by the A quadrant, B quadrant, C quadrant, and D quadrant;

c. determining a monopulse elevation difference pattern by subtracting a CD sum consisting of signals received by the C outer portion and the D outer portion from an AB sum consisting of signals received by the A outer portion and the B outer portion; and d. determining a monopulse azimuth difference pattern by subtracting a BD sum consisting of signals received by the B outer portion and the D outer portion from an AC sum consisting of signals received by the A outer portion and the C outer portion.

6. The process of claim 5 further comprising the step of designing and selecting the shapes of the inner and outer portions of the aperture array antenna to achieve predetermined difference patterns.

7. The process of claim 5 further comprising the step of designing and selecting the shapes of the inner and outer portions of the aperture array antenna to optimize the sum, elevation difference, and azimuth difference patterns.

8. The process of claim 5, further comprising the steps of:

a. directing signals from radiators in the outer quadrants through an outer quad array corporate feed prior to the determining steps; and b. directing signals from radiators in the inner quadrants through an inner quad array corporate feed prior to the determining steps, wherein the aperture array antenna is passive.

9. The process of claim 8 further comprising the step of designing and selecting the shapes of the inner and outer portions of the aperture array antenna to achieve a predetermined difference pattern.

10. The process of claim 8 further comprising the step of designing and selecting the shapes of the inner and outer portions of the aperture array antenna to optimize the sum, elevation difference, and azimuth difference patterns.

11. The process of claim 5, further comprising the steps of:

a. directing signals from radiators in the outer quadrants through an outer quad array receive corporate feed prior to the determining steps; and b. directing signals from radiators in the inner quadrants through an inner quad array receive corporate feed prior to the determining steps, wherein the aperture array antenna is an active aperture phased array antenna.

12. The process of claim 11 further comprising the step of designing and selecting the shapes of the inner and outer portions of the aperture array antenna to achieve a predetermined difference pattern.

13. The process of claim 11 further comprising the step of designing and selecting the shapes of the inner and outer portions of the aperture array antenna to optimize the sum, elevation difference, and azimuth difference patterns.

14. The process of claim 5, further comprising the steps of:

a. directing sum signals from the radiators to an independently controllable sum aperture distribution network prior to the determining a monopulse sum step, wherein the radiators are independently controlled; and b. directing difference signals from the radiators to an independently controllable difference aperture distribution network prior to the steps of determining a monopulse elevation difference and determining a monopulse azimuth difference, wherein the aperture array antenna is an active aperture phased array antenna.

15. The process of claim 14 further comprising the step of designing and selecting the shapes of the inner and outer portions of the aperture array antenna to achieve a predetermined difference pattern.

16. The process of claim 14 further comprising the step of designing and selecting the shapes of the inner and outer portions of the aperture array antenna to optimize the sum, elevation difference, and azimuth difference patterns.

* * * * *